(12) United States Patent
De Porrata-Doria I Yaguee et al.

(10) Patent No.: US 12,436,537 B2
(45) Date of Patent: Oct. 7, 2025

(54) MOVABLE PLATFORM FOR TAKING INVENTORY AND/OR PERFORMING OTHER ACTIONS ON OBJECTS

(71) Applicants: KEONN TECHNOLOGIES S.L., Barcelona (ES); UNIVERSITAT POMPEU FABRA, Barcelona (ES)

(72) Inventors: Ramir De Porrata-Doria I Yaguee, Barcelona (ES); Ausias Vives Prat, Barcelona (ES); Rafael Pous Andrés, Barcelona (ES); Victor Casamayor Pujol, Barcelona (ES); Bernat Gastón Braso, Barcelona (ES)

(73) Assignees: KEONN TECHNOLOGIES S.L., Barcelona (ES); UNIVERSITAT POMPEU FABRA, Barcelona (ES)

( * ) Notice: Subject to any disclaimer, the term of this patent is extended or adjusted under 35 U.S.C. 154(b) by 195 days.

(21) Appl. No.: 18/003,294

(22) PCT Filed: May 11, 2021

(86) PCT No.: PCT/EP2021/062427
§ 371 (c)(1),
(2) Date: Dec. 23, 2022

(87) PCT Pub. No.: WO2021/259550
PCT Pub. Date: Dec. 30, 2021

(65) Prior Publication Data
US 2023/0266770 A1    Aug. 24, 2023

(30) Foreign Application Priority Data
Jun. 26, 2020    (EP) .................................. 20382563

(51) Int. Cl.
*G05D 1/00*     (2024.01)
*G05D 1/224*    (2024.01)
*G06Q 10/087*   (2023.01)

(52) U.S. Cl.
CPC ......... *G05D 1/0246* (2013.01); *G05D 1/0214* (2013.01); *G05D 1/2246* (2024.01); *G06Q 10/087* (2013.01); *G05D 1/0287* (2013.01)

(58) Field of Classification Search
CPC ... G05D 1/2246; G05D 1/0287; G06Q 10/087
(Continued)

(56) References Cited

U.S. PATENT DOCUMENTS

2012/0059545 A1* 3/2012 Furuno .................. G05D 1/024
                                                        701/26
2018/0029797 A1* 2/2018 Hance .................. B65G 1/0492
(Continued)

FOREIGN PATENT DOCUMENTS

WO    2013071150 A1    5/2013
WO    2015055224 A1    4/2015

OTHER PUBLICATIONS

ISA European Patent Office, International Search Report Issued in Application No. PCT/EP2021/062427, Jun. 11, 2021, WIPO, 3 pages.

*Primary Examiner* — Krishnan Ramesh
(74) *Attorney, Agent, or Firm* — McCoy Russell LLP (57) ABSTRACT

A movable platform for taking inventory and/or performing other actions on objects, the movable platform comprising a traction system for allowing the movable platform to circulate through an area, a sensor system for identifying objects in an area based on a characteristic, and for creating information indicative of the identified objects and the position of the identified objects relative to the movable platform and in absolute space coordinates, and a control system, wherein the control system is adapted to receive the information (Continued)

created by the sensor system and to determine a direction of movement or a partial path or a movement target for the movable platform based on the received information and without using a previously created map of the area.

13 Claims, 2 Drawing Sheets

(58) Field of Classification Search
USPC .......................................................... 701/26
See application file for complete search history.

(56) References Cited

U.S. PATENT DOCUMENTS

2019/0220043 A1* 7/2019 Zamora Esquivel .. G06V 10/82
2022/0182498 A1* 6/2022 Singh ....................... G08G 1/16

* cited by examiner

MOVABLE PLATFORM FOR TAKING INVENTORY AND/OR PERFORMING OTHER ACTIONS ON OBJECTS

CROSS REFERENCE TO RELATED APPLICATIONS

The present application is a U.S. National Phase of International Application No. PCT/EP2021/062427 entitled "MOVABLE PLATFORM FOR TAKING INVENTORY AND/OR PERFORMING OTHER ACTIONS ON OBJECTS," and filed on May 11, 2021. International Application No. PCT/EP2021/062427 claims priority to European Patent Application No. 20382563.3 filed on Jun. 26, 2020. The entire contents of each of the above-listed applications are hereby incorporated by reference for all purposes.

The present invention refers to a movable platform for taking inventory and/or performing other actions on objects according to claim 1 as well as a method for controlling movement of a movable platform for taking inventory and/or performing other actions on objects according to claim 7.

BACKGROUND AND SUMMARY

From the prior art, movable, partially autonomous working platforms are already known. For example, such movable platforms are used for taking inventory by, for example, identifying the objects in a given space where they are, for example, positioned in or on shelves, racks, tables, cabinets, boards or the floor. These platforms are also used for finding a specific object or group of objects, determining which items are in the wrong locations, determining that a certain object or a subset of objects is missing or in insufficient quantities, verifying the accuracy of information shown on labels and advertising, or any other objective.

Such movable platforms usually comprise sensor systems that allow the movable platform or an associated control system to determine, on the one side, potential obstacles that are in the way or around the movable platform and, on the other side, may be provided to allow the movable platform to determine the position of objects.

Such sensor systems include, for example, RFID readers, ultrasound range sensors, laser range finders, infrared sensors, depth sensors (3D cameras), image sensors (RGB cameras), accelerometers, compasses, gyroscopes, indoor positioning systems based on light, radiofrequency or sound waves, and the like.

Commonly known systems, however, require, for executing their objectives like taking inventory in a given space, that a map is captured and provided to the movable platform and/or its control unit based on which the movable platform can find its position and orientation (collectively known as pose), and determine its path within the map and can orientate itself using the map and the information obtained from the surroundings as well as working as a frame to reasonably determine the position of objects within it.

Capturing the map is done by the movable platform, but this necessarily requires some interaction of the movable platform with a user, and is required before the movable platform can actually fulfil its tasks, like taking inventory, preventing the platform to complete its task in a completely autonomous way. Furthermore, whenever some significant changes are made to the given space, updates of the respective map need to be captured and provided to the movable platform, requiring also the interaction with a user.

Furthermore, it is usually necessary to provide the movable platform with specific movement goals that also need to be pre-set, for example providing the movable platform with the objective to obtain information on objects within the complete given space, like a complete warehouse where the "complete space" comes from the map provided to the movable platform such that a movement always depends on the map provided to the movable platform and, consequently, any objectives or goals (also known as waypoints) can only be provided to the movable platform in the framework or context of the respective map, also resulting in potential failure of the movable platform fulfilling its task when, for example, the wrong map is provided to the movable platform for a specific space.

Objective

Starting from the known prior art, it is thus an object of the present invention to minimize the need for interaction of the movable platform with a user in that the information that is required for the movable platform to perform its task can be captured by the movable platform alone, while, at the same time, ensuring that an intended task to be performed by the movable platform is reliably completed in a completely autonomous way.

Solution

This objective is solved by the movable platform according to independent claim 1 and the method for controlling the movement of the movable platform according to claim 7. Preferred further embodiments of the invention are provided in the dependent claims.

According to the invention, movable platform for taking inventory and/or performing other actions on objects is provided, the movable platform comprising a traction system for allowing the movable platform to circulate through an area, a sensor system for identifying objects in an area based on a characteristic, like a barcode, a QR-code or an RFID tag, and for creating information indicative of the identified objects and the position of the identified objects both relative to the movable platform and in absolute space coordinates, and a control system, wherein the control system is adapted to receive the information created by the sensor system and to determine a direction of movement or a partial path or a movement target for the movable platform based on the received information and without the need for a previously created map of the area and wherein the control system is adapted to control the traction system depending on the determined direction of movement or partial path so that the movable platform moves in the determined direction or along the partial path or towards the target.

In the context of the present invention, the traction system may comprise any suitable means for moving the movable platform. For example, one or more wheels or one or more chains, one or more propellers or any other type of devices designed for moving a platform may be provided with which the movable platform can be moved through the given space. Furthermore, motors, like servomotors or other motors may be provided for actuating, for example, on such devices.

Furthermore, an internal or external energy source may be provided in or connected with the movable platform.

In the context of the present invention, a movement direction is a direction relative to the direction of the platform to which the platform may turn and along which the platform may move in partial fulfilment of its task. The movement direction may be a direction that is determined by the control unit of the movable platform in the context of a next or successive goal to be achieved.

In the context of the present invention, a partial path is considered a movement path that is smaller than the overall movement performed while fulfilling its task. The partial path may be a path that is determined by the control unit of the movable platform in the context of a next or successive movement goal to be achieved.

In the context of the present invention, a movement target is considered a pose (position and orientation) relative to the current pose of the platform towards which the platform may move in partial fulfilment of its task. The movement goal may be a position that is determined by the control unit of the movable platform in the context of a next or successive goal to be achieved.

In the context of the present invention, a movement goal is any of a movement direction, a partial path, or a movement target according the above definitions.

The sensor system can also be provided in any suitable way as long as it is adapted to obtain information on the respective objects. This may include sensors like optical sensors that use image recognition techniques in order to identify the respective objects and/or their position in a given space relative to the movable platform. Alternatively or in addition, sensors can be provided that can read specific labels for the items through direct vision of these labels such as barcode readers or QR code readers identifying the respective object and/or its position on a given shelf, rack, table, cabinet, etc. Alternatively or in addition, sensors that obtain information on the objects and/or their position in the given space that use electromagnetic waves, like RFID may be provided that can obtain information on the position or the objects themselves without requiring an image of the object. Other known techniques may be employed as well and the invention is not limited in this regard. Specifically, the sensor system may be provided depending on what actually needs to be done by the movable platform. For example, if the movable platform is to take inventory in a space (like a warehouse) where the objects are equipped with RFID tags, the sensor system will comprise one or more RFID readers.

That the movement of the movable platform is controlled without using a previously created map is to be understood in that there is no map of the given space provided to the movable platform in advance of the movable platform beginning its task, like taking inventory of objects in the given space. However, according to the present invention, it is not excluded that the movable platform creates a map of the given space in an autonomous way while performing its tasks, without the need of any interaction with a user. However, the movement of the movable platform and the determination of further movement goals are not calculated within the framework of a previously existing map but are calculated depending on the information obtained by the movable platform of the given space and/or the respective objects as well as depending on the goal or objective to be reached.

For example, if the movable platform has the task to take inventory of objects within a warehouse, this objective may be combined with information on a certain measure, such as for example the gradient of the distribution of the objects identified while moving following a specific movement goal in order to determine the next movement goal. For example, if the movable platform moves along a given path and determines that, on the right side, there are no objects to be identified while, on the left side, there are new objects that are successively identified when moving along the movement direction, it may continue its path along this movement direction as long as no obstacle is in the way of the movable platform. If it determines that, for example, at one point during its movement, no new objects are either in front of the movable platform nor on the right or on the left but the last identified objects were on the left, a control unit of the movable platform may determine that moving in the direction towards the left, or setting a partial path towards the left, or setting a movement target on the left is the most appropriate next movement step because this situation may indicate that the movable platform reaches a border of the warehouse where the further objects continue after the border on the left side while there are no new objects to be expected in front of the movable platform and on the right of the movable platform.

The control system may under certain circumstances determine a movement goal to be a random direction, a random partial path, or a random movement target. Choosing a random moving goal may be useful when the sensor system cannot provide any criteria, to break out of repetitive loops, when several movement goals have the same or very similar measures, or for any other reason.

With this method, the movable platform can be placed in any given space and it is only necessary to define the objective to be fulfilled by the movable platform such as identify and/or locate all items in the warehouse or identify and/or locate all items with a certain characteristic during 3 hours, etc. The movable platform can then, on its own, proceed with the task, not requiring any further input from a user or any (or almost no) further supervision by a user, reducing the need for interaction between the user and the movable platform.

It can also be provided that the control system is adapted to obtain, from the information received from the sensor system, and a list of already identified objects (optionally also containing their estimated positions) stored in a repository of the control system, a set of newly identified objects in space and control, depending on a measure derived from the set, the movement of the movable platform.

With this, it is possible to determine a measure, like for example a gradient, of all objects, or newly identified objects, of objects of a certain type, or any other subset of objects, making it possible to determine a movement goal which is most likely to advance in completing the objective of the movable platform.

In one embodiment, the control unit is adapted to control the movement of the movable platform depending on the measure derived from the set, wherein the measure is a gradient of a density of newly identified objects.

In another embodiment, the control unit is adapted to control the movement of the movable platform depending on the measures derived from the set, wherein the measure is the maximum of a density of objects of a given type.

Any of these embodiments may include random movements done randomly or under certain conditions. These movements may help the platform to avoid deadlocks.

The gradient may be the spatial derivation of the density of newly identified objects according to one, two or three spatial, linear or angular dimensions. In one preferred embodiment, the movement goal of the movable platform may be calculated according to the largest value of the gradient, leading the movable platform always in the direction of the highest density of potential new objects.

Moreover, the sensor system may comprise means for detecting obstacles and wherein the means for detecting obstacles are adapted to generate obstacle-information and forward the obstacle-information to the control system, wherein the control system is adapted to control the movement of the movable platform depending on the obstacle-information.

In addition to the information obtained for the respective objects, this obstacle detection allows for an improved determination of the movement goal of the movement since collisions with borders or other objects in the given space that do not have anything to do with the objects to be identified are prevented as well.

In a further embodiment, the movable platform comprises interaction means for interacting with other movable platforms, wherein the other movable platforms are platforms according to any of the preceding embodiments and the interaction means are adapted to share a list of already identified objects, and optionally also their positions, of each of the movable platforms with each of the other movable platforms.

Thereby, also a group of movable platforms can interact with each other, achieving potentially a common goal (likely the taking inventory) more efficiently.

Still further, the control system may be adapted to define successive movement goals for the movable platform according to which the control system controls the movement of the movable platform, wherein a movement goal is defined depending on the information received from the sensor system and wherein the movement goal specifies a movement direction and/or a partial path and/or a target.

Movement goals are to be understood as instructions based on which the movement over some distance and/or direction is to be performed, including for example the determination of speed, direction, distance during the movement which may include following a partial path or reaching a target position. Once the movement goal is achieved and as long as the task of the movable platform is not completed, a successive movement goal is determined. Thereby, the movement goals are successively defined by the control system of the movable platform within the range of the sensor system, avoiding "guesses" that could potentially lead to collisions with the surroundings while ensuring real-time calculation of the next movement goal or goals.

According to the invention, a method for controlling movement of movable platform for taking inventory and/or performing other actions on objects is provided, the movable platform comprising a traction system that circulates the movable platform through an area, a sensor system that identifies objects in an area based on a characteristic, like a QR-code or an RFID tag, and creates information indicative of the identified objects and the position of the identified objects relative to the movable platform, and a control system, wherein the control system receives the information created by the sensor system and determines, in response to this information, a movement goal for the movable platform based on the received information and without using a previously created map of the area and wherein the control system controls the traction system so that the movable platform moves following the movement goal.

This method achieves a more efficient movement of the movable platform in the attempt to fulfil its objective while, at the same time, reducing the interaction and supervision that needs to be provided by a user.

In one embodiment, the control system obtains, from the information received from the sensor system, a list of already identified objects and optionally their positions stored in a repository of the control system, and controls, depending on a measure derived from the set, the movement of the movable platform.

In a further embodiment, the control unit controls the movement of the movable platform depending on the measure derived from the set, wherein the measure is a gradient of a density of newly identified objects.

This allows to prevent, for example, by calculating a gradient of newly identified objects, successive movements of the movable platform along the same path without this creating new information on newly identified objects because all objects have already been identified. This provides a kind of "memory" to the movable platform.

By using the gradient or other measures, it can be ensured that the movable platform plans its movement always towards the fulfilment of the actual goal.

In one embodiment, the sensor system comprises means that detect obstacles and wherein the method comprises the means for detecting obstacles generating obstacle-information and forwarding the obstacle-information to the control system, wherein the control system controls the movement of the movable platform depending on the obstacle-information.

In addition to information on the objects, obstacle avoidance is provided with this embodiment.

Furthermore, the movable platform may comprise interaction means for interacting with other movable platforms, wherein the other movable platforms are platforms according to any of the above embodiments and wherein the interaction means of the movable platforms share a list of already identified objects, and optionally their positions, of each of the movable platforms with each of the other movable platforms.

Thereby, an interaction of movable platforms can be achieved that can, for example, reduce the time required for fulfilling the objective set for the movable platforms, like taking inventory, or increase the accuracy of the inventory, or both.

In a more specific embodiment, the interaction means share information comprising at least the list of already identified objects in real time, and optionally their positions, in real time or quasi real time (near real time) with each other. The movable platforms thus keep each other up to date, allowing for increased efficiency.

In one embodiment, the control system defines successive movement goals for the movable platform according to which the control system controls the movement of the movable platform, wherein a movement goal is defined depending on the information received from the sensor system and wherein the movement goal specifies a movement over a distance, along a path, or towards a target which is that is within the range of the sensor system. With this, incremental steps towards fulfilling the final goal or task of the movable platform are set, allowing, specifically without using a map of the given space, the accomplishment of the task.

In a further embodiment, the control system determines the movement profile and the direction of movement for achieving the movement goal based on the information received from the sensor system and, when the movement goal is completed, determines a subsequent movement goal successively until it reaches a final objective. The final objective in this context is the task the movable platform has to fulfil. For example, the task may be identifying the position of all objects within a given space or identifying the position of objects within the given space for a specific period of time, for example 3 hours. The successive determination of the movement goals depending on the final objective and depending on the information received from the sensor system makes a previously set map unnecessary.

In a further embodiment, the distance of a movement goal is shorter than 10 m or shorter than 5 m or shorter than 2 m and/or wherein the distance of a movement goal depends on the information received from the sensor system.

Depending on the range of the sensor system, the granularity of the movement goals can be determined (for example if the movement goal is determined to always be within the range of the sensor system). By determining the distance of a next movement goal depending on the information received from the sensor system, it is also possible to take into account obstacles that reduce the range of the sensor system or obstacles that result in a distortion of the obtained information. Thereby, also influences of the environment can be considered.

DETAILED DESCRIPTION

Figure 1:
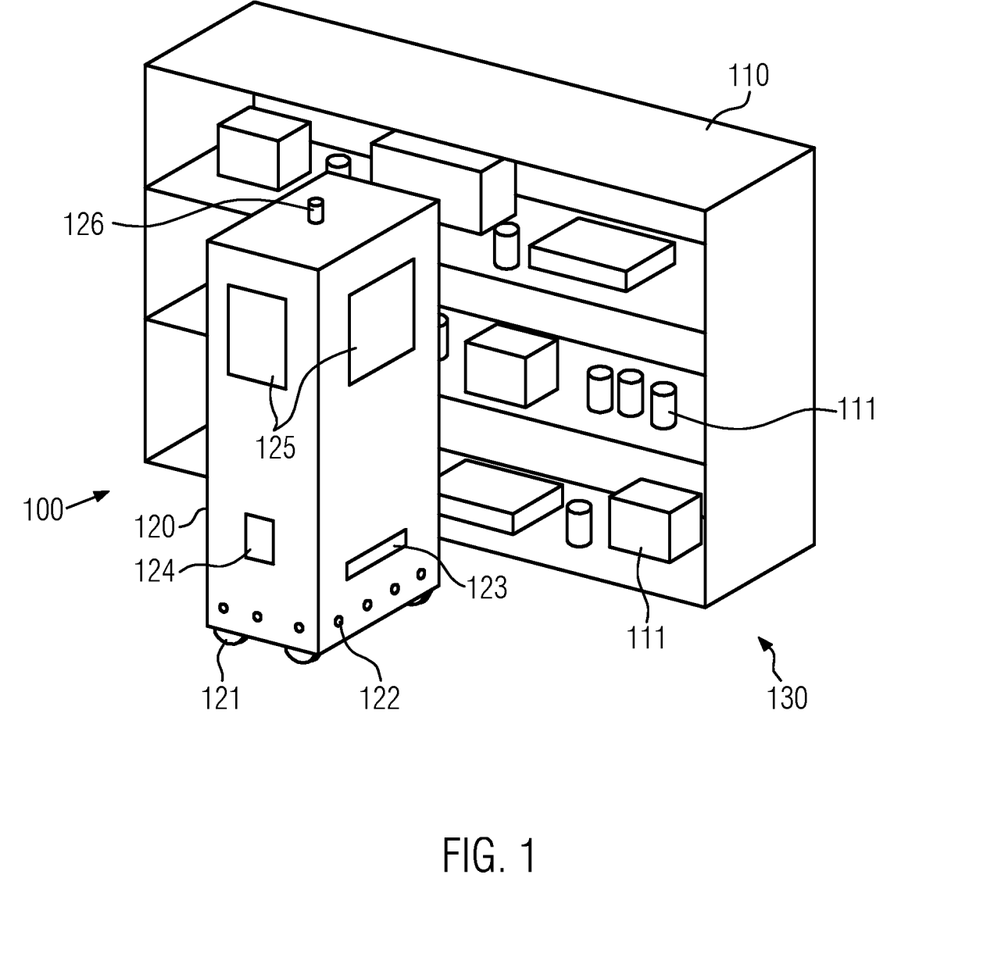
FIG. 1 shows a movable platform moving along a shelf within a given space

FIG. 1 shows a schematic depiction of a movable platform 100 that is provided in a given space only schematically indicated as space 130. The space may be preferably a closed space having a specific volume that is defined by the surrounding borders. For example, the given space 130 may be store, a warehouse, a factory, a workshop, a flat, an office or any corresponding room within a building. It can also be a given space in the outer environment that, nevertheless, is bordered somehow, for example by a fence or walls but not being closed completely, for example in view of no ceiling being provided.

The given space 130 may also be called a given area, an area, a room or any other way. The invention is thus not limited to the term "given space" or "area" but any naming of the respective space is encompassed by the invention.

Within the given space 130, there may be provided one or more storing means in which basically objects that have to be identified according to the invention are provided. For example, the storing means may be a shelf 110 in which one or more objects 111 can be provided. Those objects may, for example, be products provided with barcodes or RFID tags that can be used for identifying the objects and identifying their position. However, the invention is not limited in this regard and specifically instead of shelves, any other storage means for storing the respective objects 111 may be provided, such as for example racks, cabinets, tables or displays. The objects can also be simply positioned within the given space without being provided in corresponding storage means 110. Thus, although for explanatory purposes, reference is made here to objects within shelves, the invention is not limited in this regard and any other way of providing objects in a given space can be used instead of providing the objects on shelves.

The movable platform 100 is preferably a movable platform that can autonomously move through the given space. In order to do so, it comprises a traction system that is depicted here as a number of wheels 121. However, also in this regard, the system is not restricted. The traction system may comprise any means suitable for moving the movable platform through the given space. This, for example, also depends on the kind of movable platform. If it is a ground-based robot, wheels or slides or chains may be preferred. If it is a flying drone, propelling means may be more appropriate. In addition to the wheels 121 depicted in FIG. 1, there may be provided a drive or motor like a servomotor as part of the traction system either for all the wheels simultaneously or for each of the wheels for allowing the traction system to change the direction and/or velocity of the movable platform as need may be.

Additionally, the movable platform 100 may comprise a plurality of sensors collectively referred to as "sensor system" 122 to 126. These means may comprise one or more ultrasound 122 and/or LIDAR sensors 123 or other optical or radiofrequency sensors that allow for determining the position of obstacles and/or the respective objects in the surrounding of the movable platform. For example, those sensors may be used for not only identifying objects within the given space but also or alternatively identifying the physical surroundings like walls or other borders of the given space or physical obstacles that are not the objects that are to be identified by the movable platform.

In addition, the sensor system may comprise one or more sensors 124 to 126 that are specifically adapted for identifying and determining the position of objects. Those sensors can be active and/or passive in the sense that they actively determine the position of the objects by, for example, being provided in the form of a camera 124 that takes images from the surrounding and optionally uses (or the respective images taken are used by a corresponding control unit of the movable platform) the image information obtained in order to perform image recognition techniques that are commonly known in the art in order to identify objects and their position relative to the movable platform. Furthermore, one or more RFID antennas 125 may be provided that can transmit and receive electromagnetic waves in the form of electromagnetic signals to and from one or more of the objects 111 in the surrounding of the movable platform where this information is received from RFID tags of the respective objects. The electromagnetic signals transmitted by the antennas in the form of electromagnetic waves are generated by one or more senders of electromagnetic waves 127, such as for example RFID readers. This electromagnetic waves are then reflected or processed by the RFID tags in response to which an RFID identification signal is sent for being received by the antennas. The respective senders 127 are thus active. The combination of the active senders 127 and passive antennas 125 then results in the identification of the objects and/or the estimation of the position of the respective objects in the given space.

Although not shown in FIG. 1, the movable platform also comprises a control system (also called control unit). Preferably, this control system is integrated in the movable platform, i.e. is a physical part of the movable platform. However, there can also be embodiments where the control system is provided separately from the movable platform. Such separate control system may be advantageous in the case where there is provided more than one movable platform that move through the given space in order to allow the control system to control the movement of all movable platforms using, for example, information obtained from each of the movable platforms about the obstacles in the given space and/or information obtained on the objects to be identified in the given space.

The control system may be provided in the form of a specifically suitable computer system or in any other suitable way. The control system may also comprise interaction means for interacting with a user in case it is necessary that the user provides information to the control system, for example, in terms of an objective that needs to be fulfilled by the movable platform and/or in order to perform diagnostic methods and/or in order to provide the information on the work done by the movable platform to the user.

In the embodiment depicted in FIG. 1, the movable platform is realized as an "inventory taking" platform that obtains information on the objects within the given space, such as their position and the kind of object by, for example, reading out information from RFID tags and/or bar codes and/or QR codes provided on or at the objects. In this sense, the movable platform is not provided in a way that allows for interaction with the objects in the given space. However, there may also be provided embodiments where the movable platform comprises interacting means for performing actions on the objects, like physically interacting with the objects by, for example, taking an identified object and moving it somewhere else. This moving of the objects or a plurality of objects after they have been identified or found can be provided as an objective for the movable platform.

In general, the movable platform or the control system may be provided with a task or objective to be fulfilled by the movable platform before the movable platform starts its movement in the given space. This task will specify a specific aim, like taking inventory for 3 hours or any other reasonable duration, covering a certain area or a certain length, identifying and/or locating a certain number of objects, identifying or locating a certain subset of all objects, or reaching a certain level of accuracy. Alternatively or in addition the task may comprise changing the position of objects in a specific way, sorting objects, cleaning a space, cleaning objects, checking objects and the like. However, no map of the given space will be provided to the movable platform before it starts its movement.

According to the invention, irrespective of the objective that needs to be fulfilled by the movable platform while moving through the given space, the movable platform is not provided with a map of the given space in any way. This means that before the movable platform starts its task, it has no prior or predetermined knowledge of either the size and/or shape of the given space or of any obstacles and/or objects within the given space.

As a consequence, the movable platform uses, according to an embodiment of the invention, the information obtained by the sensor system (specifically, the information obtained about the objects in the given space and/or information about the obstacles in the given space) in order to determine its movement. This is performed by considering the objective for the movable platform "taking inventory" and determining the movement goals that take into account the information obtained from the sensor system for performing movement until the objective is fulfilled or an aborting condition is reached.

For example, if it is the task of the movable platform to take inventory of the objects provided in the given space for a predetermined amount of time (like some hours), the movable platform may determine its subsequent movement goal starting from its current position by evaluating a movement direction, a partial path, or a target position (or a plurality of such values or an arbitrary combination) in which more new objects, which have not been previously identified, are to be expected. This can be performed, for example, by storing a list of previously identified objects together with position information determined by moving through the given space for the respective objects and comparing this information to newly identified objects in order to determine whether those objects have already been previously identified or are in fact newly identified objects. From the information obtained from the objects in the surrounding, a measure, like a gradient, can be determined based on which subsequent movement goals can be determined.

From the set of newly identified objects (which are confirmed by comparing all identified objects with the list of already identified objects and identifying those objects as "newly identified objects" that are not on the list), it is possible, for example, to determine a distribution (like a gradient) of newly identified objects in the surrounding of the movable platform. Subsequently, in view of the task of identifying all of the objects in the given space, the movable platform may determine its movement goal in a direction, along a path, or towards a target in a direction of the greatest gradient (or any other suitable measure) determined from the current position. The movement goal may be set to be at a distance that is equal to or smaller than the range of the sensor system. As the movable platform can only determine the respective distribution of objects within the range of the sensor system from its current position, this results in a reliable determination of the next movement goal. Once this movement goal is reached, the movable platform may determine a next movement goal in the same way successively until the overall objective (in this case, taking inventory) is reached or an aborting condition may be met. Such an aborting condition may, for example, be that, if the movable platform has not identified new objects for a pre-set amount of time (or a pre-set total travelled distance) while moving through the given space, the movable platform may abort the task as it is very likely that it is already completed. Such aborting conditions may be necessary in order to avoid the movable platform travelling through the given space without this providing new information.

Though the above description and the description as follows focusses on taking inventory, the respective embodiments can be applied to other actions to be performed in the given space, like cleaning the given space, sorting objects finding a specific object or group of objects, determining which items are in the wrong locations, determining that a certain object of subset of objects is missing or in insufficient quantities, verifying the accuracy of information shown on labels and advertising, or any other actions. Corresponding sorting conditions may also be set for such actions.

While the movable platform moves through the given space, it can also be provided that the movable platform determines or obtains a map of the given space and specifically the position of the objects within this map. This can be done by storing the information obtained on the objects and the respective surroundings, thereby allowing to create a map at least of those spots of the given space visited by the movable platform.

Furthermore, although only a single movable platform is depicted in FIG. 1, it is encompassed by the invention that there may also be provided interaction means on the movable platform for interacting with other movable platforms of, for example, the same kind. This can comprise, for example, sharing a list of previously identified objects and/or its relative position or the relative positions of obstacles determined by the movable platforms in order to improve the efficiency with which the other movable platforms, in cooperation, can fulfill the respective objective. Also, the maps that are being created dynamically by the different platforms can be shared. Thereby, for example, it is possible to reduce the overall time required for taking inventory of the objects in the given space since the above mentioned objective may be completed earlier than planned or earlier than the intended objective of taking inventory for a given period of time. Interaction between movable platforms may also increase the accuracy of the system, as well as its reliability and resilience to mechanical or other failures.

This can also comprise providing the movable platforms with different objectives. One movable platform may have the objective of taking inventory of all the objects in the given space, whereas the other movable platform may have the task of sorting the objects in the given space according to a specific scheme, for example, moving all objects of a specific type into one shelf, as depicted in FIG. 1.

FIGS. 2a to 2d show the movement of the movable platform through the given space. This is depicted using an example where objects are provided in shelves and where the movable platform moves along a path where there is, on the one side of the movable platform, a border of the given space, and on the other side of the movable platform, the shelf in which the objects are stored. Of course, the invention is not limited in this regard and the shape of the given space as well as the position of objects and the manner in which the objects are actually provided (in a shelf, on a board, or on the ground of the given space).

The range of the sensor system is shown in FIGS. 2a to 2d as a dashed circle 290 surrounding the movable platform. It is clear that the range of the sensor system not necessarily is or has the shape of a circle and can have any other dimension and/or shape. Furthermore, for explanatory purposes, the objects and the environment are shown in dashed lines for the regions that the movable platform has not yet reached, whereas the corresponding objects and surroundings are shown in full lines for regions where the movable platform has already been.

The further process for determining the movement goals of the movable platform successively is explained with regard to FIGS. 2a to 2d. The objective of the movable platform in the given space may have been provided to the movable platform in advance of starting its movement. The depiction in FIGS. 2a to 2d may be "somewhere" within the movement of the movable platform, thus not necessarily showing, in FIG. 2a, the beginning of the movement of the movable platform.

Figure 2A:
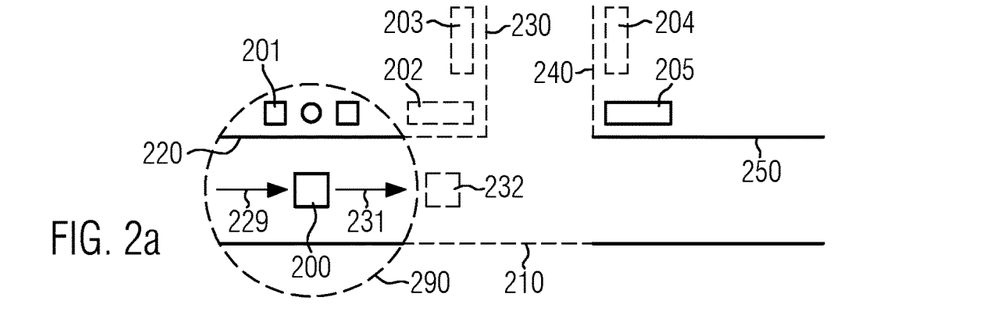
FIG. 2 shows a schematic depiction of how a next movement goal is determined depending on the current position of the movable platform.

In FIG. 2a, a first situation is depicted, wherein the movable platform 200 moves in from the left side of the image, and within its sensor range 290, has already identified the objects 201, which, for exemplary purposes, are shown as four objects. Also, on the other side of the T-cross, the object 250 has been identified previously. It has also identified or found the parts of the surrounding 210 bordering the given space. The shelf is shown as item 220, from which also a portion has already been identified, as shown with the full line. Likewise, the portion 250 of the shelf has also been identified. The object 202, the object 203 and the part 230 and 240 of the shelf as well as the border 230 have not yet been identified.

Coming from the left side of the image in FIG. 2a, it is assumed that the objects 201 are objects that have not been previously identified and the movable platform planned its current movement position based on the last position it was in based on, for example, a gradient of potentially newly identified objects. For the next movement goal which is shown in the position 232, the movable platform cannot use a previously obtained map of the given space, as this is not available to the movable platform 200. So to say, the dashed portions of the movable space are blind spots in view of the knowledge of the movable platform. Instead, it uses the information obtained in the previous movement step, which is shown as 229, during which it has newly identified the objects 201 and has identified an "obstacle" in the sense of the surrounding border 210 as well as the position of the shelf 220 (also forming some kind of physical "border"). The movable platform may also optionally use all other previous movement steps that led to the platform identifying the object 205 and shelf 250. Using the information about the borders 210 and 220, the movable platform may determine that only the movement direction 231 (horizontal in the image plane) is possible because otherwise the room for moving is limited or even blocked. Thereby, the movement goal 231 is determined. As was described previously, movement goal 231 may represent a distance in a given direction and/or a partial path and/or a target position. All movement goals in the following description may represent any combination of these.

However, based on this information, the movable platform cannot ascertain whether it should travel to the right or to the left from the position where the movable platform 200 is shown in FIG. 2a. In order to actually determine the movement direction, the movable platform 200 may information on the objects 201, which have been identified for the first time. As the movable platform moved, in the previous movement 229, to the right, and thereby identified the new objects 201, the gradient of the density of newly identified objects is large in the direction 229 and is thus also large in the direction 231, which points to the right. Optionally and/or in addition, the movable platform may use information on the object 205 and may determine (based on the coordinates of the object 205 determined in absolute space) that the space in between its current position and the already identified object 205 has not yet been visited. In order to achieve the "global" target of identifying as many objects as possible, it may therefore be reasonable for the movable platform to try to fill the gap between its current position and the object 205.

Therefore, the movable platform may determine its next movement goal 232 to the right of the current position of the movable platform 200 and the movement to this movement goal is set along the movement direction 231. It is noted that the movable platform may also decide to move to the left again in order to identify objects that have been missed when traveling in the direction 229.

The movement goal 232 and specifically the distance to the position where the movable platform currently is may, for example, be set slightly outside the range of the sensor system in the position where the movable platform currently is. Alternatively, the movement goal 232 may also be set to be within the range of the sensor system from the position where the movable platform 200 currently is. It may also be set significantly closer than the range of the sensor system in order to have a more fine-grained calculation of the movement of the movable platform. Having set the movement goal, the movable platform then moves in line with this movement goal along the direction of movement and/or along the specific partial path or towards the movement target to complete the movement goal 232.

Figure 2B:
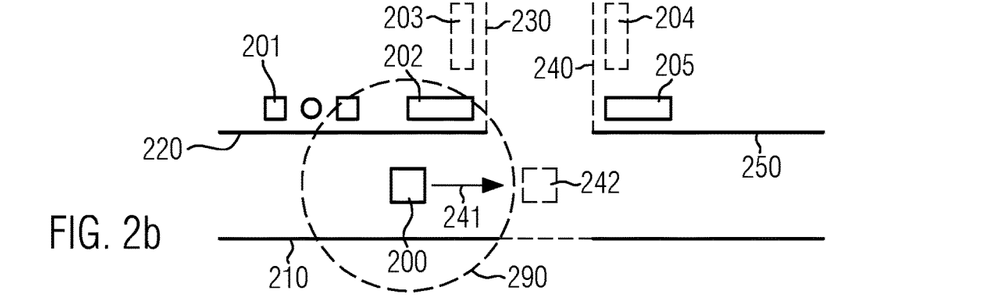

While moving along this direction in order to fulfill the next movement goal, the movable platform attempts to determine the position of objects and/or obstacles in the surrounding of the movable platform, like the object 202 and obtains the borders 210 and 220 of the environment, as is shown in FIG. 2b.

Having reached the movement goal 232, which is now the position where the movable platform is in FIG. 2b, the next movement goal is to be determined. As the gradient of the density of the newly identified objects is still very large in the direction to the right of the movable platform (the new objects 202 has been identified) and since the borders of the environment indicate once again the respective direction 241 as a reasonable direction of movement in order to fulfil the target of identifying as may objects as possible, the movable platform may determine its next movement goal to be 242, as this is allowable under the conditions of the environment (no obstacles are within the range of the sensor system) and since the gradient of newly identified objects is large in this direction, which, in view of the objective of the movable platform to identify the objects in the given space, is one step further in fulfilling this task.

Figure 2C:
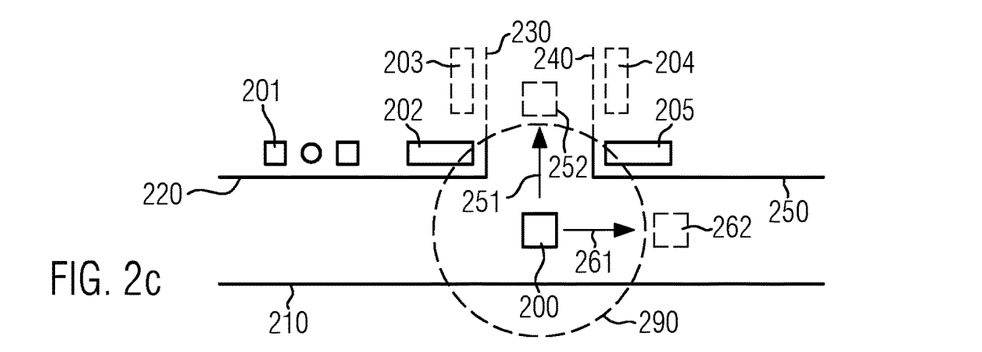

In FIG. 2c, the movable platform has completed movement goal 242. Compared to FIG. 2b, no new objects have been identified, since the object 203 is still out of reach of the range 290 of the sensor system of the movable platform. However, further information on the surrounding environment in terms of the border 210 extending completely from the left to the right and the borders 220 and 250 indicating a gap (the T-cross) have been identified. Additionally, the gap between the previously identified object 205 and the shelf 250 and the shelf 220 and the objects 201 and 202 has been filled so the movable platform is now aware of the obstacles in the surrounding. This information shows that the movement in the same direction as previously travelled from FIGS. 2b to 2c will potentially result in previously missed objects being detected when moving along the shelf 250 again.

Based on the combination of this information, the movable platform can then decide that the movement is to be prosecuted further in the direction 251 to the movement goal 252 or whether the movement is to be prosecuted in the direction 261 towards the movement goal 262. While the movement goal 252 cannot be estimated to reveal new objects that have not been previously identified, the movement goal 262 will, if at all, result in identifying previously missed objects, as the movable platform already visited the shelf 250 and the object 205.

There are, thus, in principle four potential directions of movement: one to the left, one to the right, one to the top and one to the bottom of the image. Among these opportunities, the movable platform decides based on the information of the surrounding environment and the objective as well as the information on the objects identified as follows.

A movement to the left would be possible in view of the environmental conditions, but would, if at all, result in identifying only objects that have been missed when travelling along this direction for the first time. This determination may be made based on a list of previously identified objects stored, for example, in a repository associated with the control system of the movable platform. A movement to the bottom of the image in FIG. 2c is not possible due to physical constraints of the given space and it will not advance in progressing to a goal of the movable platform (its objective). A movement to the right is possible and may, like the movement to the left, result in previously missed objects being identified. The movement in the direction of the top in FIG. 2c is possible in view of the physical constraints of the surrounding environment. Information on whether new objects are to be expected is, however, not available, since the respective position was not yet visited and information from the past regarding, for example, a positive gradient in this direction is not available.

Thus, the movable platform (or its control unit respectively) has to decide to either travel to the right or left or to travel to the top of the image. This decision can be made depending on priorities set by the movable platform. If it is prioritized to (at least once) travel along already previously visited paths over travelling along completely unknown regions, the movable platform may decide to either move to the left or to the right. If it is prioritized to travel along completely unknown regions, the movable platform may decide to move to the top of the image to the movement goal 252. Further priorities may be provided in order to decide whether to move to the left or to the right. For example, a priority may be to visit again positions that have not been visited for some time over immediately visiting the same positions again. If this is the case, the decision would be made to rather move to the right than to the left.

It is noted that there may also be situations, wherein only a "backwards movement" to a position where the movable platform already was, is possible due to the physical constraints. Even though this will not help in fulfilling the task of the movable platform (although some new objects that have previously been missed may be identified), in such a case, the movable platform would nevertheless decide to take this way because otherwise movement would be impossible due to the physical constraints.

This means that, according to some embodiments, there is a priority according to which the control system of the movable platform determines the further progress of the movement of the movable platform.

Firstly, the potential movement directions and/or partial paths of movement for setting the next movement goal are determined (4 in total in FIG. 2c). From those potential movements, those are ruled out that are not possible depending on the physical constraints of the environment. For the potential movements that remain, the movement with the highest priority may be chosen where the priority may be set in advance or may be dynamically determined. The dynamic determining of priorities may, for example, comprise prioritizing movements along unknown paths lower than movements along already previously visited paths as long as the previously visited path has only been visited once. If previously visited paths have already been visited twice, the priority of traveling along these previously visited paths may be set smaller than the priority to travel along paths not already travelled along. Alternatively, it may also be that the priority to travel along unknown paths is set always larger compared to travel along already previously visited paths, which would be a preset and not dynamic priority. Additionally, depending on other (dynamic) conditions, like the time to complete the task compared to the time already spent, priorities regarding whether to travel along already previously visited paths or not yet visited paths may be set. For example, as long as at least half of the (pre-set) time for performing the task has not lapsed, the priority may be to travel along not already visited paths. When more than half of the time has lapsed, the priority may be to visit already previously visited paths over visiting not already visited paths. Any other setting may be chosen according to the circumstances.

In one example, it may thus be that, with the highest priority, those movements are chosen that indicate that advancement in fulfilling the objective of the movable platform can be achieved (for example, because a gradient of potential newly identified objects is large). If more than one such movement is possible, it may be that the platform prefers the movement in the direction of the largest gradient (or corresponding measure).

If such an advancement is not available, a movement path will be chosen where there is no information available on whether or not there are any objects to be expected that have not been previously identified because simply no information on objects in this direction is available.

If such a direction is also not available, the last option is to travel along a path that the movable platform has already traveled (in FIG. 2c, this would mean travelling back to FIG. 2b or travelling towards movement goal 262).

By prioritizing the decision-making in the control system, according to this scheme, it is ensured that the movable platform will always continue moving until the final goal is achieved, or the movable platform receives an instruction to stop movement, for example, from the user.

Figure 2D:
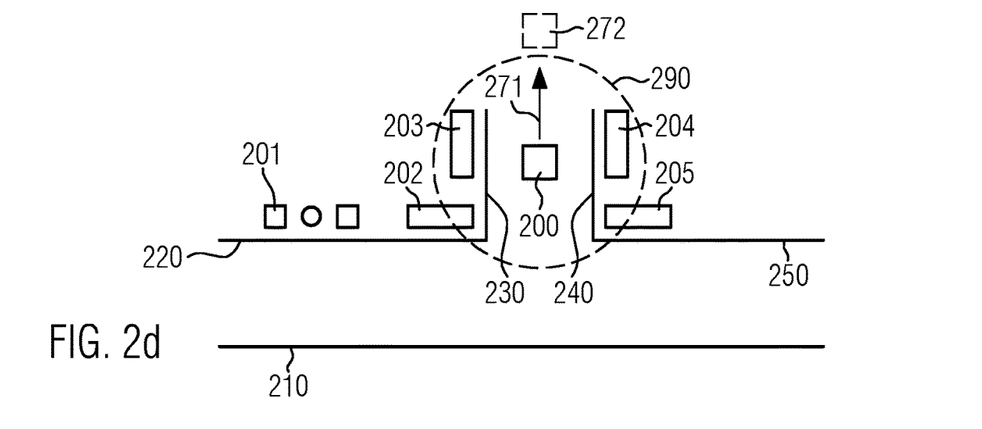

In any case, in FIG. 2c, the control system determines that a movement in the direction 251 to the position 252 is reasonable under the above scheme and according to the priorities, it is decided, that the movable platform does not move to the right towards potential movement goal 262. In FIG. 2d, the movable platform has then reached this position and has now identified the object 203 as well as the remaining depicted portions of the surrounding space 230 and 240. In the next step, as new information on the newly identified objects (the object 203 and the object 204) is available, the next movement goal may be set along the direction 271 to a position 272, based on the decision-making according to the above explained scheme.

By successively performing such determination of movement goals under the condition that the movement of the movable platform leads to advancing towards completion of the overall objective of the movable platform (for example, identifying all the objects in the given space or identifying as many new objects as possible within a prescribed time limit) and by considering the information available on the environment and/or objects that have already been identified or were previously identified, the movable platform can complete its objective without requiring a previous map of the given space and without requiring guidance of an operator.

As already indicated above, the distance of the next movement goal and the current position of the movable platform may depend on the range 290 of the sensor system. If the range of the sensor system is, for example, 10 m, the distance of the next movement goal compared to the current position of the movable platform may be set to be 10 m or slightly larger than the range of the movable platform, for example, 11 m, or may be set to be even smaller, for example, 2 m or 3 m.

The first alternative ensures that at least until reaching the next movement goal, no physical obstacles can block the way of the movable platform. The second alternative reduces the potential number of steps and calculations of movement goals and can be specifically advantageous in less complex shapes of the given space. For example, if the given space consists only of a rectangular room, in which one more straight shelves are provided, this method can be advantageous because there is a small likelihood of collisions. The last alternative allows for a fine-grained but processor-intensive calculation of the movement goals and also allows for taking into account minor changes in the surrounding environment and can specifically be advantageous in case that there is a complicated shape of the shelves and/or position of the objects and/or the environmental conditions, such as borders of the given space.

For the second alternative, in order to avoid collisions, a fail-safe may be provided that permanently determines the distance to surrounding objects, and if the distance falls below a given threshold (for example, 1 m), immediately starts the movement of the movable platform and triggers the calculation of a new movement goal because the surrounding environment (see the above-described scheme) does not allow further movement in the respective direction.

The invention claimed is:

1. A movable platform for taking inventory and/or performing other actions on objects, the movable platform comprising:
   a traction system for moving the movable platform through an area,
   a sensor system for identifying objects in the area based on a characteristic, and for creating information indicative of the identified objects and the position of the identified objects relative to the movable platform and in absolute space coordinates, and
   a control system, wherein the control system is adapted to:
      receive the information created by the sensor system,
      determine a direction of movement or a partial path or a movement target for the movable platform based on the received information and without using a previously created map of the area, and
      control the traction system depending on the determined direction of movement or partial path so that the movable platform moves in the determined direction or along the partial path or towards the movement target, wherein the control system is adapted to obtain, from the information received from the sensor system and a list of already identified objects stored in a repository of the control system, a set of newly identified objects in space, wherein the control system is adapted to control, depending on a measure derived from the set, the movement of the movable platform, and wherein the control system is adapted to control the movement of the movable platform depending on the measure derived from the set, wherein the measure is a gradient of a density of newly identified objects.

2. Movable platform according to claim 1, wherein the sensor system comprises means for detecting obstacles and wherein the means for detecting obstacles are adapted to generate obstacle-information and forward the obstacle-information to the control system, wherein the control system is adapted to control the movement of the movable platform depending on the obstacle-information.

3. Movable platform according to claim 1, wherein the movable platform comprises interaction means for interacting with other movable platforms, and wherein the interaction means are adapted to share a list of already identified objects of each of the movable platforms with each of the other movable platforms.

4. Movable platform according to claim 1, wherein the control system is adapted to define successive movement goals for the movable platform according to which the control system controls the movement of the movable platform, wherein a movement goal is defined depending on the information received from the sensor system and wherein the movement goal specifies a movement over a distance within the range of the sensor system.

5. Movable platform according to claim 1, wherein the characteristic is one or more of a QR-code and an RFID tag.

6. A method for controlling movement of a movable platform for taking inventory and/or performing other actions on objects, the movable platform comprising:
   a traction system that moves the movable platform through an area,
   a sensor system that identifies objects in an area based on a characteristic, and creates information indicative of the identified objects and the position of the identified objects relative to the movable platform and in absolute space coordinates, and
   a control system, wherein the control system is adapted to:

receive the information created by the sensor system, determine, in response to this information, a direction of movement or a partial path or a movement target for the movable platform based on the received information and without using a previously created map of the area, and control the traction system depending on the determined direction of movement or the partial path so that the movable platform moves in the determined direction or along the partial path or towards the movement target, wherein the control system obtains, from the information received from the sensor system, and a list of already identified objects stored in a repository of the control system, a set of newly identified objects in space and controls, depending on a measure derived from the set, the movement of the movable platform, and wherein the control system controls the movement of the movable platform depending on the measure derived from the set, wherein the measure is a gradient of a density of newly identified objects.

7. Method according to claim 6, wherein the sensor system comprises means that detect obstacles and wherein the method comprises the means for detecting obstacles generating obstacle-information and forwarding the obstacle-information to the control system, wherein the control system controls the movement of the movable platform depending on the obstacle-information.

8. Method according to claim 6, wherein the movable platform comprises interaction means for interacting with other movable platforms, and wherein the interaction means of the movable platforms share a list of already identified objects of each of the movable platforms with each of the other movable platforms.

9. Method according to claim 8, wherein the interaction means share information comprising at least the list of already identified objects in real time with each other.

10. Method according to claim 6, wherein the control system defines successive movement goals for the movable platform according to which the control system controls the movement of the movable platform, wherein a movement goal is defined depending on the information received from the sensor system and wherein the movement goal specifies a movement over a distance that is within the range of the sensor system.

11. Method according to claim 10, wherein the control system determines the movement profile and the direction of movement for achieving the movement goal based on the information received from the sensor system and, when the movement goal is reached, determines a subsequent movement goal successively until it reaches a final objective.

12. Method according to claim 10, wherein the distance is shorter than 10 m or shorter than 5 m or shorter than 2 m and/or wherein the distance of a movement goal depends on the information received from the sensor system.

13. Method according to claim 6, wherein the characteristic is one or more of a QR-code and an RFID tag.

* * * * *